US008116632B2

(12) United States Patent
Miniscalco et al.

(10) Patent No.: US 8,116,632 B2
(45) Date of Patent: Feb. 14, 2012

(54) SPACE-TIME DIVISION MULTIPLE-ACCESS LASER COMMUNICATIONS SYSTEM

(75) Inventors: William J. Miniscalco, Sudbury, MA (US); Robert D. O'Shea, Harvard, MA (US); Irl W. Smith, Concord, MA (US); Howard L. Waldman, Acton, MA (US)

(73) Assignee: Raytheon Company, Waltham, MA (US)

( * ) Notice: Subject to any disclaimer, the term of this patent is extended or adjusted under 35 U.S.C. 154(b) by 699 days.

(21) Appl. No.: 12/323,715

(22) Filed: Nov. 26, 2008

(65) Prior Publication Data
US 2009/0214216 A1    Aug. 27, 2009

Related U.S. Application Data

(60) Provisional application No. 60/991,425, filed on Nov. 30, 2007.

(51) Int. Cl.
*H04B 10/00* (2006.01)
*H04B 7/212* (2006.01)
*H04J 14/08* (2006.01)

(52) U.S. Cl. ......... 398/118; 398/121; 398/125; 398/98; 370/347; 370/395.4; 455/404.1; 455/427

(58) Field of Classification Search ............... 398/98, 398/103, 118, 121, 124, 125, 130, 135, 140; 370/203, 335, 337, 347, 352, 395.4; 375/146, 375/260, 343; 701/29, 33, 35; 455/137, 455/426, 426.1, 427, 428, 404.1, 456.1, 456.2, 455/553.1
See application file for complete search history.

(56) References Cited

U.S. PATENT DOCUMENTS

| 4,201,442 A | | 5/1980 | McMahon et al. |
| 4,278,327 A | | 7/1981 | McMahon et al. |
| 4,298,979 A | * | 11/1981 | Dobyns et al. ................ 370/347 |
| 4,385,799 A | | 5/1983 | Soref |
| 4,585,307 A | | 4/1986 | Dammann et al. |
| 4,720,171 A | | 1/1988 | Baker |
| 4,720,172 A | | 1/1988 | Baker |
| 4,737,019 A | | 4/1988 | Baker |
| 4,964,701 A | | 10/1990 | Dorschner et al. |
| 5,018,835 A | | 5/1991 | Dorschner |
| 5,093,747 A | | 3/1992 | Dorschner |
| 5,373,393 A | | 12/1994 | DeJule et al. |
| 5,440,654 A | | 8/1995 | Lambert, Jr. |
| 6,244,652 B1 | * | 6/2001 | Shoudou et al. .............. 296/155 |

(Continued)

FOREIGN PATENT DOCUMENTS

EP    0 325 429 A2    7/1989

(Continued)

OTHER PUBLICATIONS

Love; Liquid-Crystal Phase Modulator for Unpolarized Light; Applied Optics; vol. 32, No. 13; May 1, 1993; pp. 222-223.

(Continued)

*Primary Examiner* — Loha Ben
(74) *Attorney, Agent, or Firm* — Daly, Crowley, Mofford & Durkee, LLP

(57) ABSTRACT

A space-time division multiple-access (STDMA) laser communications (lasercom) system and related techniques. The STDMA system includes a plurality of remote nodes and an STDMA access node which uses precise electronic beam steering and beacons to provide access to each of a plurality of remote access nodes by means of both space and time-division multiple access.

26 Claims, 6 Drawing Sheets

U.S. PATENT DOCUMENTS

| | | | |
|---|---|---|---|
| 6,347,001 | B1 | 2/2002 | Arnold et al. |
| 6,511,020 | B2 * | 1/2003 | Higgins ................. 455/12.1 |
| 6,542,739 | B1 * | 4/2003 | Garner ..................... 455/427 |
| 6,611,755 | B1 * | 8/2003 | Coffee et al. ............. 701/213 |
| 6,850,497 | B1 * | 2/2005 | Sigler et al. .............. 370/310 |
| 6,892,131 | B2 * | 5/2005 | Coffee et al. ............. 701/200 |
| 7,272,321 | B1 | 9/2007 | Kuo et al. |
| 7,489,993 | B2 * | 2/2009 | Coffee et al. ............... 701/35 |
| 2003/0012486 | A1 | 1/2003 | Ducellier et al. |
| 2004/0130774 | A1 | 7/2004 | Giles et al. |
| 2004/0252938 | A1 | 12/2004 | Ducellier et al. |
| 2005/0213877 | A1 | 9/2005 | Wu et al. |
| 2008/0031627 | A1 | 2/2008 | Smith et al. |

FOREIGN PATENT DOCUMENTS

| | | |
|---|---|---|
| EP | 0 325 429 A3 | 7/1989 |
| WO | WO 99/45665 | 9/1999 |
| WO | WO 00/25456 | 5/2000 |
| WO | WO 2004/010175 A2 | 1/2004 |
| WO | WO 2004/010175 A3 | 1/2004 |
| WO | WO 2005/027370 A2 | 3/2005 |

OTHER PUBLICATIONS

PCT Search Report of the ISA for PCT/US2007/016358 issued on Jan. 28, 2008.

PCT Written Opinion of the ISA for PCT/US2007/016358 issued on Jan. 28, 2008.

Smith et al.; "Optical Communications System;" U.S. Appl. No. 11/462,569, filed Aug. 4, 2006.

PCT International Preliminary Examination Report of the ISA dated Jun. 10, 2010 for PCT/US2008/013243.

Dhamdhere et al.; "Joint Node and Link Assignment in an STDMA Network;" IEEE 65th Vehicular Technology Conference, 2007, VTC2007-Spring; Apr. 1, 2007; ISBN: 978-1-4244-0266-3; pp. 1066-1070.

PCT Search Report of the ISA for PCT/US2008/013243 issued on Feb. 24, 2009.

PCT Written Opinion of the ISA for PCT/US2008/013243 issued on Feb. 24, 2009.

PCT International Preliminary Report on Patentability of the International Bureau for PCT/US2007/016358, dated Feb. 19, 2009.

Dorschner, et al.; "Multi-Access Lasercom for Air-Space Communications;" Raytheon Company; Unclassified—Noforn; Oct. 16, 2003; 14 pages.

Dorscher, et al.; "Multi-Access Lasercom Node for Satellite Communications;" Raytheon Company; Unclassified—Noforn; Oct. 16, 2003; 6 pages.

"Electronic Beam Steering in Access Networks;" Milcom:08; Unclassified; Nov. 17, 2008; 26 pages.

Miniscalco, et al.; "Coherent Beam Combining and Optical Space-Time Division Multiple Access;" Proc. Of SPIE; vol. 7814; 78140S-1; downloaded Jan. 11, 2011; 10 pages.

* cited by examiner

SPACE-TIME DIVISION MULTIPLE-ACCESS LASER COMMUNICATIONS SYSTEM

RELATED APPLICATIONS

This application claims the benefit of U.S. Provisional Application No. 60/991,425 filed Nov. 30, 2007 under 35 U.S.C. §119(e) which application is hereby incorporated herein by reference in its entirety.

STATEMENT REGARDING FEDERALLY SPONSORED RESEARCH

This invention was made with Government support under Contract FA9453-05-C-0238 awarded by the Air Force Research Laboratory. The Government may have certain rights in the invention.

FIELD OF THE INVENTION

The structures and techniques described herein relate to optical transmit-receive systems and more particularly to free-space laser/optical transmit-receive systems.

BACKGROUND OF THE INVENTION

As is known in the art, free-space optical (FSO) laser communications (lasercom) links are used for high-bandwidth data transmission where optical fiber is not practical. These links are costly in terms of dollars, size, weight, and power (SWaP). For FSO network access nodes, as with most access nodes, the average data rate for each user is typically much lower than the link line rate.

Prior art approaches to multiple access for FSO lasercom have used dedicated facilities. The earliest approaches duplicated the complete transmit/receive (Tx/Rx) and beam control apparatus for each user. In essence, a single access system with full data rate for each user was used. While this approach is appropriate for backbone networks, it is not cost-effective for access networks and provides no scaling benefit as the number of users in an access network increases. Thus, the cost and SWaP grow linearly with the number of users.

More advanced prior approaches share the beam forming system between users, but require separate Tx/Rx and fine beam steering/tracking modules for each user. While this provides some scaling benefit, the most expensive modules must still be duplicated for each user. In addition, all users must be within the field-of-view of a single, high-quality telescope. This restricts the angular distribution of users to a cone with about a two-degree full angle.

SUMMARY OF THE INVENTION

In accordance with the concepts, techniques and systems described herein, an optical transit-receive system includes a free-space optical (FSO) multiple-access node that uses precise electronic beam steering to provide access to a variable number of users at remote terminals by means of both space- and time-division multiple-access (STDMA). The STDMA access node utilizes a plurality of tracking beacons and tracking sensors to locate and track a plurality of remote terminals. Thus, the multiple-access node always knows the precise location of each remote terminal prior to arranging a communications downlink and/or uplink between the multiple-access node and the remote terminal. By using a tracking beacon and tracking sensor, delays in locating (i.e., spatially acquiring) remote terminals and the delays needed for the remote terminals to acquire the multiple-access node are minimized or even eliminated. The spatial acquisition process is known to be the most time-consuming step in establishing FSO communications links when mobile nodes are used. Also, by combining beam hopping (space division) and burst mode communication (time division) the system exploits the benefits of fast, agile beam control provided by an optical phased array. The hopping time does not depend on the angle as seen from the multiple-access node between the remote terminal on which the hop is initiated and the remote terminal on which it is terminated. Thus the multiple-access node can use STDMA to communicate in any sequence with remote terminals randomly distributed over its operational field-of-regard. This lowers the cost and size, weight, and power (SWaP) of the access node and increases its flexibility compared with dedicated FSO links.

By using a space-time division multiple-access (STDMA) technique, the largest and most expensive modules of the STDMA access node are shared among all of the remote terminal users. Thus, the technique and systems described herein leads to systems having lower cost and reduced SWaP as compared with prior art techniques.

In one exemplary embodiment of an STDMA system, a multiple-access node includes an optical communications aperture and a plurality of pointing, acquisition and tracking (PAT) apertures. The tracking beacon sent to the remote terminals to enable them to continuously track the position of the multiple-access node can be integrated into the PAT apertures or implemented as a separate module. The multiple-access node enables communications between a plurality of remote terminals. A single laser communications (lasercom) transmit (Tx) and receive (Rx) unit is used for all users. The lasercom Tx portion provides a communications beam that illuminates the remote terminal Rx aperture, via the optical communications aperture. Space-division multiple-access is provided by using high-speed, agile, precise electronic beam steering to hop the beam among the plurality of remote terminals (i.e., from user to user). This is coordinated with time division multiple-access, which is provided by assigning each remote terminal user a time slot coincident with the dwell time of the communications beam on that remote terminal during which user data is exchanged. While this description is in terms of a communications beam being transmitted from the access node to multiple remote terminals, the same concept applies to information being received via beams from the remote terminals. The transmit direction of the multiple-access node beam steering module is identical to its receive direction, thus the optical communications aperture can simultaneously transmit data to and receive data from a remote terminal. This is referred to as monostatic or bidirectional operation of the communications aperture. An access node beam steering module operates to direct (or steer) the communications beam to the appropriate remote terminal and receive the beam from the remote terminal at the correct time. To enable fast hopping without spatial re-acquisition, one embodiment of the multiple-access node has one pointing, acquisition, tracking (PAT) aperture and one tracking beacon for each remote terminal. Thus each PAT aperture continuously receives a tracking beacon from a respective one of the plurality of remote terminals. In some embodiments and/or at some points in time, a transmit beam provided by the remote terminal may also serve as the tracking beacon. In this way, the access node's Tx/Rx optical train can be immediately pointed to the remote terminal when its time slot is active. In addition, the PAT aperture transmits a tracking beacon pointed at the remote terminal so that the user can continuously track the position of the access node. The tracking beacon can also be implemented as a separate module. These tracking beacons can also be modulated to transmit low-bandwidth control and order wire information between the access node and the users. Another embodiment of the multiple-access terminal appropriate for simultaneously servicing a very large number of users does not provide a PAT aperture and tracking beacon for every user. Instead, it cycles through a limited number of PAT apertures and beacons such that the re-acquisition process for a specific remote terminal occurs in advance of its scheduled visit time. Thus when the visit time arrives, the tracking links between the multiple-access terminal and the remote terminal are already established and no acquisition delays are incurred. Furthermore, since the PAT apertures are much smaller and less expensive than the communications aperture and the tracking beacons are much lower power than the communications beam (and hence less expensive to provide), it is cost-effective to scale an STDMA access node to a large number of users. One performance cost is that because the access node Tx/Rx facility is shared among all users, the average bandwidth per user goes down as the number of users increases. This is a common situation in access networks (e.g., cable internet access, fiber-to-the-home systems) and can be addressed through policy-based quality-of-service (QoS) management with resource scheduling. Wavelength division multiplexing (WDM) can also be used to increase the bandwidth of the Tx/Rx facility and thereby the bandwidth per user with minimal increase in cost and SWaP. Another performance cost is the latency, which for a specific user is the time the access node spends communicating with other users until it resumes communicating with the user in question. Optimizing system performance requires a trade-off between bandwidth efficiency and latency and buffer size. This trade-off can be adjusted dynamically on a per-user basis as part of the QoS policy negotiation and updated using control information provided on the modulated tracking beacons.

DETAILED DESCRIPTION OF THE PREFERRED EMBODIMENTS

Figure 1:
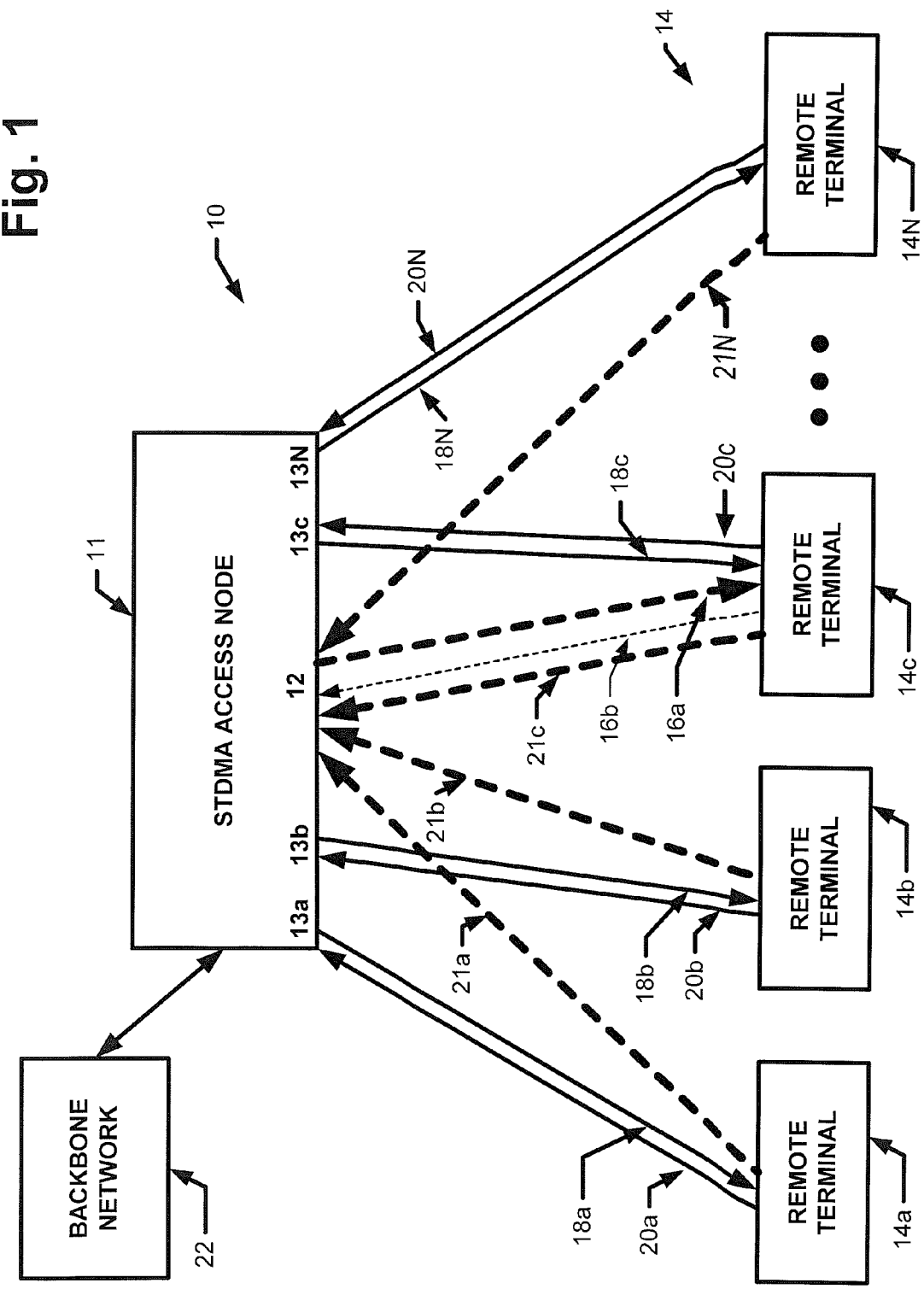
FIG. 1 is a block diagram of a space-time division multiple-access (STDMA) system.

Referring now to FIG. 1, a space-time division multiple access (STDMA) system 10 includes an STDMA access node 11 having a single optical communications aperture 12 and a plurality of pointing, acquisition, and tracking (PAT) optical apertures 13a-13N. The system also includes a plurality of remote terminals 14a-14N, generally denoted 14.

In general overview, STDMA access node 11 uses precise electronic beam steering of a transmit communications downlink (D/L) beam 16a and a receive communications uplink (U/L) direction 16b for the uplink beam provided via optical aperture 12 to provide bidirectional network connectivity to remote terminals 14a-14N by means of both space- and time-division multiple-access. This approach combines beam hopping (space division) and burst mode communication (time division) to exploit the benefits of fast, agile, precise beam control provided by optical apertures with electronic beam steering. Using a single optical communications aperture 12 to service a plurality of remote terminals 14 lowers the cost and size, weight, and power (SWaP) of access node 11 compared to access nodes that provide dedicated FSO links for each user.

As will become apparent from the description hereinbelow, space-division multiple-access is provided by using high-speed, agile, precise electronic beam steering to hop communications D/L beam 16a and U/L receive direction 16b among remote terminals 14a-14N. Time division multiple-access is provided by assigning each remote terminal 14a-14N a time slot coincident with the dwell time of the D/L beam 16a and U/L direction 16b on that remote terminal. Thus, STDMA access node 11 operates such that bidirectional communications are possible with the appropriate one of the plurality of remote terminals 14a-14N as a result of D/L transmit beam 16a and U/L receive direction 16b being pointing at that remote terminal at the correct time.

Accordingly, at any given instant in time, access node 11 (e.g., via the beam steering module) directs a transmit optical beam (e.g., D/L beam 16a) and a receive direction (e.g., U/L 16b) at one of the remote terminals 14a-14N and is able to transmit to and receive from that remote terminal. The time that access node 11 dwells on a specific one of the remote terminals 14a-14N coincides with the time slot allocated to that user. The access node can support a variable number of users up to the maximum for which it has been designed. The maximum is determined by a number of factors that include the number of PAT apertures and tracking beacons, the aggregate bandwidth capacity of the multiple-access node, and the service requirements of the remote terminals. As mentioned above, in a preferred embodiment, there is one PAT aperture and tracking beacon dedicated to each active remote terminal. In other embodiments, however, the number of PAT apertures and tracking beacons may be fewer or greater than the number of active remote terminals.

By using a space-time division multiple-access (STDMA) technique, the largest and most expensive modules of access node 11 can be shared among all remote terminals. Thus, the techniques and systems described herein lead to systems having lower cost and reduced SWaP as compared with prior art techniques.

Turning again to FIG. 1, in the exemplary embodiment shown, a single laser communications (lasercom) transmit (Tx) and receive (Rx) unit in STDMA access node 11 communicates with all remote terminals 14a-14N through transmit communications D/L beam 16a and receive communications U/L direction 16b controlled using the single communications aperture 12. Access node 11 steers transmit D/L beam 16a and receive U/L direction 16b to each of the remote terminals 14a-14N at a desired time and for a desired time period.

In FIG. 1, D/L beam 16a and U/L direction 16b are shown as being directed at remote terminal 14c. Thus in this case, optical communications aperture 12 in access node 11 is pointed at remote terminal 16c. Accordingly, remote terminal 14c transmits U/L communications beam 21c which coincides with communications U/L direction 16b (i.e. look direction 16b) such that U/L communications beam 21c is received at optical communications aperture 12. D/L beam 16a dwells on remote terminals 14c for a predetermined period of time and then is pointed at another one of the remote terminals 14a-14N.

Thus, it should be understood that while D/L beam 16a and U/L direction 16b are shown in FIG. 1 as being directed at remote terminal 14c, at different points in time, D/L beam 16a and U/L direction 16b are directed by access node 11 in a progression to each of the remote terminals 14a-14N. Hence, in FIG. 1, each remote terminal 14a-14N is shown with an U/L communications beam (e.g. beams 21a-21N). It should be appreciated, however, that optical communications between remote terminals 14 and access node 11 can only take place with the particular remote terminal at which access node 11 points communications aperture 12.

In one embodiment, communications beams 21a-21N only turn on when access node 11 points communications aperture 12 at the remote terminal. Thus, if the system of FIG. 1 operated in this mode for example, only remote terminal 14c would provide a communications U/L beam (i.e. beam 21c). The other remote terminals 14 would not provided any communications U/L beam and thus the other beams, 21a, 21b, 21N shown in FIG. 1 would not exist at the instant of time depicted in FIG. 1.

As mentioned above, at different points in time, access node 11 points communications aperture 12 at different remote terminals for a specific period of time. Thus, there is a programmed progression of communications among the remote terminals. This programmed progression of communications among the remote terminals, including the order of progression, the time at which communications occurs, and the duration of communications (dwell time), is referred to as a communications cycle or hopping sequence.

To enable fast hopping without spatial re-acquisition, each of remote terminals 14a-14N provides a respective one of tracking beacons 20a-20N to one of the PAT aperture 13a-13N. In embodiments in which the number of PAT apertures is the same as or greater than the number of remote terminals, remote terminals 14a-14N provides a respective one of tracking beacons 20a-20N to a corresponding one of the PAT aperture 13a-13N. Thus, each PAT aperture 13a-13N continuously receives a respective one of the plurality of tracking beacons 20a-20N. Tracking beacons 20a-20N allow the access node's Tx/Rx optical train to be immediately pointed to the appropriate one of the plurality of remote terminals 14a-14N during the appropriate time slot. These beacons 20a-20N can also be modulated to transmit low-bandwidth control and order wire information between the remote terminals 14a-14N and access node 11. Such control and order wire information may be exchanged through low-bit-rate encoding of the tracking beacons.

In addition to the tracking beacons 20a-20N provided by remote terminals 14a-14N, the access node transmits tracking beacons 18a-18N pointed at respective remote terminals 14a-14N so that remote terminals 14a-14N can continuously track the position of access node 11. These tracking beacons can be included as part of the PAT apertures 13a-13N or implemented using separate apertures. These beacons 18a-18N can also be modulated to transmit low-bandwidth control and order wire information between access node 11 and the remote terminals 14a-14N. Such control and order wire information may be exchanged through low-bit-rate encoding of the tracking beacons.

Each remote terminal 14a-14N also provides a transmit communications beam 21a-21N directed at the access node to coincide in direction and time with the U/L receive direction 16b, which the access node communications aperture 12 points at the appropriate remote terminal. As mentioned above, in some embodiments, the communications beam from the remote terminals are only on while the access node dwells on a specific remote terminal and correspond to the direction of beam 16b.

In other embodiments, however, the communications beam from the remote terminal (e.g. beams 21a-21N from terminals 14a-14N) may be operated continuously rather than only when the access node dwells on that remote terminal. In this way the communications beams perform the function of the tracking beacons 20a-20N and separate communications and tracking beams are not needed, only a change in modulation during the dwell time.

In the embodiment shown in FIG. 1, there is one instance of a PAT aperture 13a-13N for each remote terminal 14a-14N being supported. This is because continuous control and tracking (as enabled by beams 18a-18N and 20a-20N) is desired between the access node 11 and each remote terminal 14a-14N in order to maximize bandwidth efficiency by avoiding the need for re-acquisition, and for the timely communication of control information that enables dynamic bandwidth allocation. It should be noted, however, that continuous control and tracking may not be required in every application. Thus, in some embodiments, the number of PAT apertures may differ from the number of active remote terminals.

One performance cost of the system is that because the access node Tx/Rx facility has a fixed data rate and is shared among all users, the average bandwidth per user goes down as the number of users increases. This is a common situation in access networks (e.g., cable internet access, fiber-to-the-home) and can be addressed through policy-based quality-of-service (QoS) management with resource scheduling. Wavelength division multiplexing (WDM) can also be used to increase the bandwidth of the Tx/Rx facility and thereby the bandwidth per user with minimal increase in cost and SWaP. Another performance cost is the latency produced by the time the access node spends communicating with other users. This results in a trade-off between bandwidth efficiency and latency and buffer size. This trade-off can be adjusted dynamically on a per-user basis as part of the QoS policy negotiation.

It should be appreciated that the aggregate bandwidth of the access node is shared among the number of remote terminals currently being serviced. Even if spatial re-acquisition is not required, some bandwidth inefficiency is inherent in the hopping (space division) operation because it takes a certain amount of time to settle and reform the beam on each remote terminal. This time depends upon the steering mechanism. Mechanically steered beams would be too slow for hops greater than the field-of-view of a telescope, typically $\leq 2°$. In the preferred embodiment electronic beam steering is used because of its speed and open-loop precision. For typical heated optical phased arrays (OPAs) using current generation nematic liquid crystals, the time to redirect a beam between arbitrary angles is approximately 5-10 ms depending upon the type of liquid crystal and the wavelength used. The hopping time does not depend on the angle as seen from the access node between the remote terminal on which the hop is initiated and the remote terminal on which it is terminated. Dual-frequency liquid crystals are much faster than the above-noted steering time and can reduce this beam redirection time by an order of magnitude. Those of ordinary skill in the art will appreciate how to select an appropriate crystal for a particular application, including the considerations of speed, steering efficiency, and reliability.

Latency is determined by the hopping sequence (specifically, the time it takes for the access node to revisit the same remote terminal in the process of cycling through all the active remote terminals). Because it utilizes buffering and burst mode transmission, STDMA is not suitable for traffic that requires low latency. However, unidirectional streaming traffic (e.g., video) can be handled by means of buffering at each end (i.e., both at the access node and the remote terminal) to reduce jitter to an acceptable level.

It should also be appreciated that there is a trade-off between bandwidth efficiency and latency. As the number of users increases, the bandwidth efficiency is maintained by keeping the ratio between the beam settling time and dwell time constant and increasing the cycle time. But this increases the latency. Maintaining a fixed value of latency requires decreasing the dwell time as users are added, but this decreases bandwidth efficiency. Because electronic steering provides fast, agile, hop-angle-independent beam control, the trade-off between bandwidth efficiency and latency can be adjusted in real time. In addition, QoS management allows individual users to receive different average bandwidth and latency performance, both of which can also be adapted in real time.

Although in the exemplary embodiment of FIG. 1, STDMA access node 11 is shown to include a single communications aperture 12 and a number of PAT apertures 13 and tracking beacons 18 which are equal to the number of remote users 14, it should be appreciated that this need not be so. In some embodiments, it may be desirable or necessary to provide an access node having more that one communications aperture. In other embodiments, it may be desirable or necessary to provide an access node having a number of PAT apertures and tracking beacons which are different than the number of remote terminals. For example, the number of PAT apertures may be greater than or less than the number of remote terminals, which is the situation that will occur if the number of remote terminals varies in time. Implementing the multiple-access node with a plurality of optical communications apertures increases the aggregate bandwidth of the node and therefore the level of service provided to the remote terminals.

In one embodiment in which the number of PAT apertures is less than the number of remote terminals, the PAT apertures are cycled such that each remote terminal does not necessarily have a tracking aperture 13 and beacon 18 associated with it at all times. In this case, the access node manages the PAT apertures and tracking beacons as a resource pool and assigns a PAT aperture 13 and tracking beacon 18 to each remote terminal well before the time the access node points the communications D/L beam 16a and U/L receive direction 16b at the remote terminal. In this way the spatial re-acquisition process is completed before the assigned communications time slot for the remote terminal is reached in the hopping sequence. Thus, each remote terminal may receive a different beacon 18 during different hopping sequences. Because the remote terminal will have no beacon 18 to track at certain times during the hopping cycle, it must also re-acquire the access node when a new tracking beacon 18 is assigned to it. It should be appreciated that the re-acquisition time depends upon the duration of the time interval during which no tracking beacon and/or PAT aperture is available. However, target trajectory prediction algorithms exist to reduce the re-acquisition time.

It should also be appreciated that since the PAT apertures 13a-13N are much smaller and less expensive than communications aperture 12, it is cost-effective to scale an STDMA access node to provide communications services to a large number of remote terminals. Also, the tracking beacons 18a-18N are much lower power than the communications beam 16a and thus are also less expensive to implement.

As will be described in detail below, the STDMA access node 11 performs functions that can be divided into three major groups as follows: a communications (user traffic) group; a pointing, acquisition, and tracking (PAT) group; and a node control group.

Figure 2:
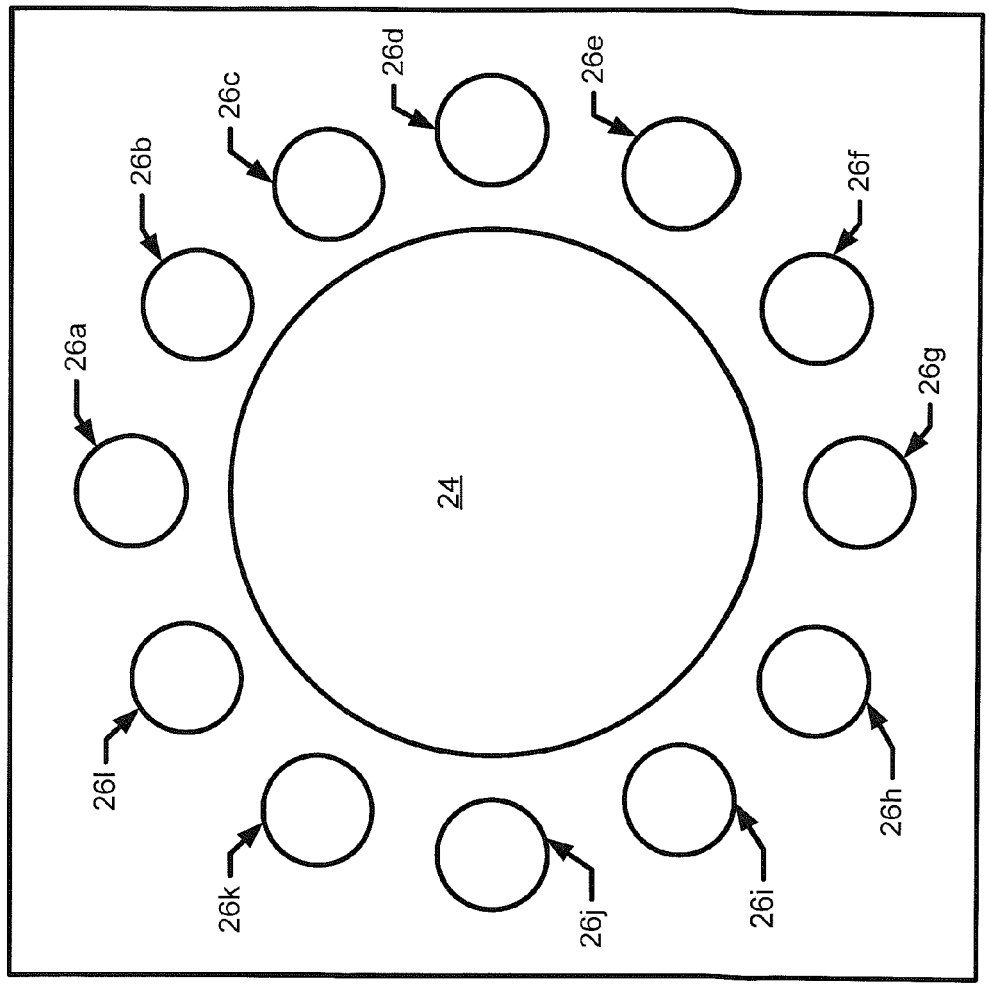
FIG. 2 is a block diagram of a space-time division multiple access (STDMA) system.
Figure 3:
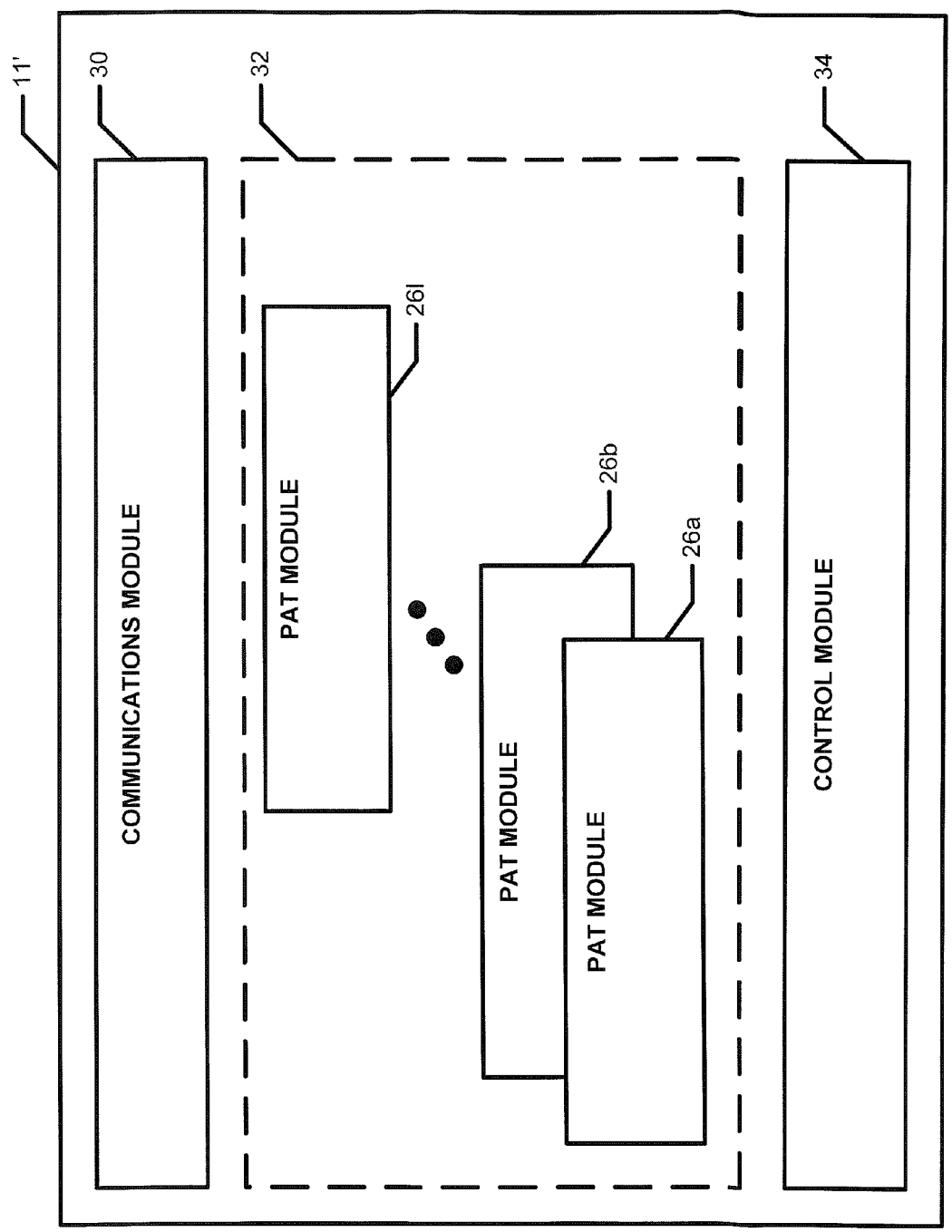
FIG. 3 is a block diagram of an STDMA access node which may be used in an STDMA system of the type shown in FIG. 1.

Referring now to FIG. 2 an exemplary embodiment of a physical implementation of an STDMA access node 23 includes one large optical communications aperture 24 used for high-speed, unidirectional or bidirectional communications with remote terminals (e.g., remote terminals 14a-14N in FIG. 1). As discussed above in conjunction with FIG. 1, optical communications aperture 24 is shared among all remote terminals (e.g., remote terminals 14a-14N in FIG. 1) and transmits the relatively high power beam needed to close the link. Because in most applications the communications link budget requires a larger power x aperture product than the tracking link budget, the communications aperture 24 in FIG. 3 is shown as larger than the PAT apertures 26. It should be recognized, however, that there are applications in which this aperture size difference will be smaller or nonexistent. In other embodiments, there may be a plurality of optical communications apertures 24 for a single access node 23. This would enable a single multiple-access node to service more remote terminals or provide better service to the same number of remote terminals by parallel operation of independent hopping sequences for each of the optical communications apertures. In other embodiments, a plurality of optical communications apertures 24 may be implemented with some used just for transmission of the downlink beam to the remote terminal (16a in FIG. 1) and others just for receiving the uplink beam from the remote terminal (16b in FIG. 1).

STDMA access node 23 also includes a plurality of PAT apertures 26a-26l. As discussed above in conjunction with FIG. 1, in preferred embodiments there is one PAT aperture 26a-26l for each active remote terminal (e.g., terminals 14a-14N). As discussed above, PAT apertures 26a-26l continuously transmit a relatively low power tracking beacon to each active remote terminal and in return receives a tracking beacon from the remote terminal. In an alternate embodiment, the tracking beacons (18 in FIG. 1) can be transmitted from apertures distinct from 26a-26l. In other embodiments, the number of PAT apertures 26 and tracking beacons may less than or greater than the number of remote terminals (14 in FIG. 1). Techniques discussed above in conjunction with FIG. 1 exist for pooling the PAT and tracking beam resources in situations where the number of remote terminals exceeds the number of PAT apertures and tracking beacons.

It should be appreciated that in cases in which a remote terminal leaves the access network (e.g., due to failure or for any other reason), then it is possible to re-allocate the PAT aperture and tracking beacon to a different remote terminal. Likewise, if a remote terminal joins the network, then PAT aperture and tracking beacon resources are assigned to it. These can be either dedicated to that remote terminal or pooled resources as discussed above in conjunction with FIG. 1. The re-allocation of communications resources (e.g., bandwidth, latency) associated with remote terminals entering and leaving the network can be accomplished, for example, by exchanging control information via modulating the beacons as described above in conjunction with FIG. 1. The re-allocation may also be performed via non-associated control channels such as radio links.

Referring now to FIG. 3, an STDMA access node 11', which may be the same as or similar to STDMA access node 11 described above in conjunction with FIG. 1, includes a communications system 30, a PAT system 32 and a control system 34. Each system 30, 32 and 34 will be described in further detail below in conjunction with FIGS. 4-6, respectively.

Briefly, however, communications system 30 utilizes an optical communications aperture (e.g., apertures 12 and 24 described above in conjunction with FIGS. 1 and 2, respectively) and performs transmit (Tx) and receive (Rx) operations (including all opto-electronics), beam forming optical functions and beam steering optical functions for the communications beams. Thus, communications system 30 operates such that the access node transmit beam and the receive direction are pointed toward the appropriate remote terminal at the correct time. With respect to multiplicities, the communications system 30 is one-to-many. Thus, there will be one instance that supports multiple remote terminals. In embodiments for which there are a plurality of optical communications apertures, there will be multiple instances of communications modules 30.

PAT system 32 includes a plurality of modules 26a'-26l'— i.e., one module for each of the apertures 26a-26l described above in conjunction with FIG. 2. PAT system 32 performs functions needed for receiving a tracking beacon (which may also be the communication beam) from the remote terminal and generating pointing/tracking information for the communications module, the functions needed to transmit a continuous tracking beacon to all the remote terminals being supported, and the functions needed to encode low-bandwidth control information on the transmitted tracking beacon and decode control information on the tracking beacon received from the remote terminals. While assigned to a specific remote terminal, each instance of the PAT module 26a-26N operates as if it is the only PAT module in the system and is controlling the communications module. Only when the access node is actually communicating with its assigned remote terminal, however, is this control information actually delivered to the communications module. The control module determines which PAT instance is controlling the communications module. In one embodiment, each PAT module 26a-26l has a one-to-one relationship. That is, there is one instance for each remote terminal being supported. This is because continuous tracking and control is needed between the access node and each remote terminal in order to maximize bandwidth efficiency by avoiding the need for re-acquisition, and for the timely communication of control information that enables dynamic bandwidth allocation. As described above, however, other embodiments which do not use a one-to-on relationship for PAT modules 26a-26l are also possible.

The control module 34 provides the overall control and management of the STDMA access node. Such functions include, but are not limited to, adding and deleting remote terminals to or from the access network, assigning PAT and tracking beacon resources to remote terminals in either a dedicated or shared manner, allocating and dynamically updating the communications resources for each remote terminal (QoS management), creating and updating the hopping sequence for the communications modules, determining which instance of the PAT module is controlling the communications module at a given time, authentication and authorization of remote terminals, fault and performance management of the access node.

Figure 4:
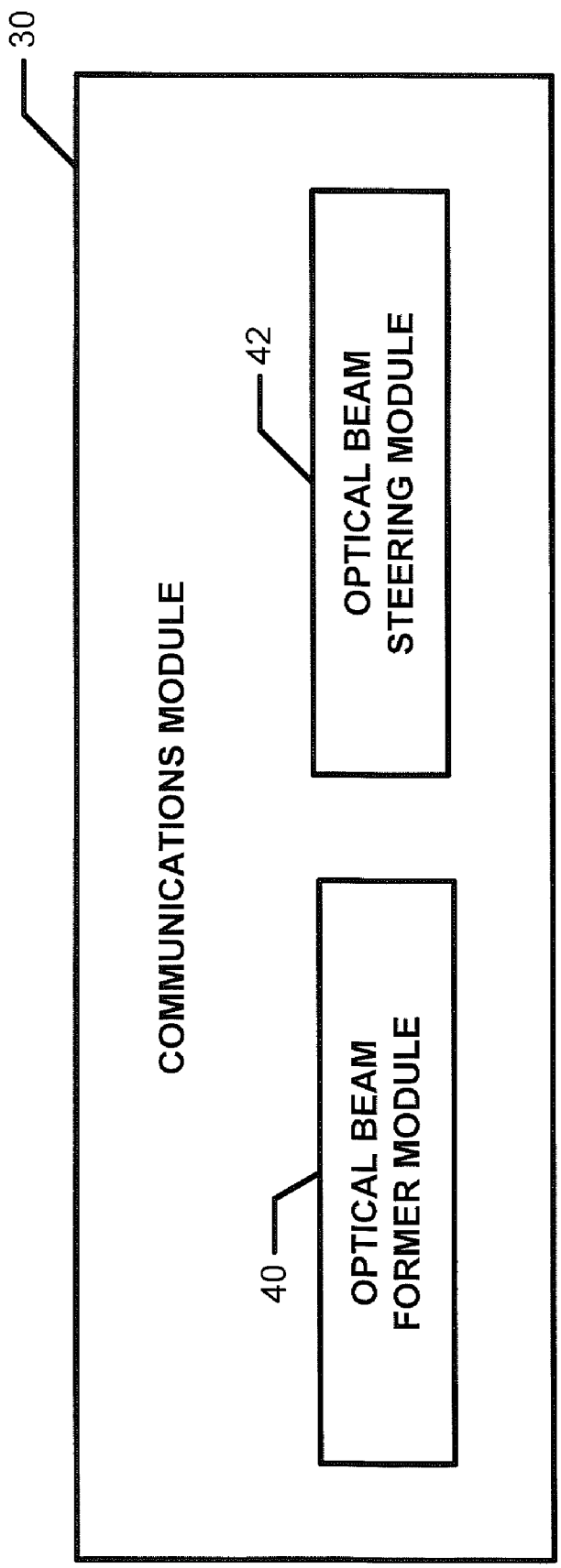
FIG. 4 is a block diagram of a communications module which may be used in an STDMA access node of the type shown in FIGS. 1-3.

Referring now to FIG. 4, communications module 30 includes an optical beam forming module 40 and an optical beam steering module 42 which operates to ensure that the access node transmit beam and the receive direction are pointed toward the appropriate user at the correct time. A significant amount of prior art exists for the design of beam forming modules in a wide variety of applications. An important consideration in the design of the beam forming module is whether the communications module 30 supports bidirectional (simultaneous transmit and receive) or unidirectional (transmit or receive only) operation. In contrast, the design and implementation of the beam steering module 42 is critical to the successful implementation of STDMA. This is because it provides the required fast beam agility needed to hop the beam from remote terminal to remote terminal in an acceptably small interval of time that is independent of the angular separation between the remote terminals as seen from the access node. For this reason electronic beam steering is used in the preferred embodiment. Beam steering module 42 may, for example, be provided as the type described in one of U.S. Pat. Nos. 7,215,472 or 7,428,100 both assigned to the assignee of the present application and incorporated herein by reference in there entirety.

As discussed above, a transmit communications downlink (D/L) beam (e.g., D/L beam 16a in FIG. 1) and a receive communications uplink (U/L) directions (e.g., U/L direction 16b in FIG. 1) provided through a single communications aperture (e.g., communications aperture 12 in FIG. 1) is steered to each of the remote terminals (e.g., remote terminals 14a-14N in FIG. 1) at a desired time and for a desired time period. The beam steering module 42 performs this function.

In operation, the transmit communications channels (e.g., D/L 16a and associated aperture and electronics described above) carry the user traffic to and the receive communications channels (e.g., U/L 16b and associated aperture and electronics described above) receive the user traffic from the remote terminals. The basic configuration is one beam steering module (BSM) 42 that can handle bidirectional (Tx plus Rx) traffic. At any given instant, the beam steering module 42 directs a transmit optical beam and a receive direction at one of the remote terminals and is able to transmit to and receive from that terminal. The time that the BSM dwells on a specific one of the remote terminals coincides with the time slot allocated to that user.

Figure 5:
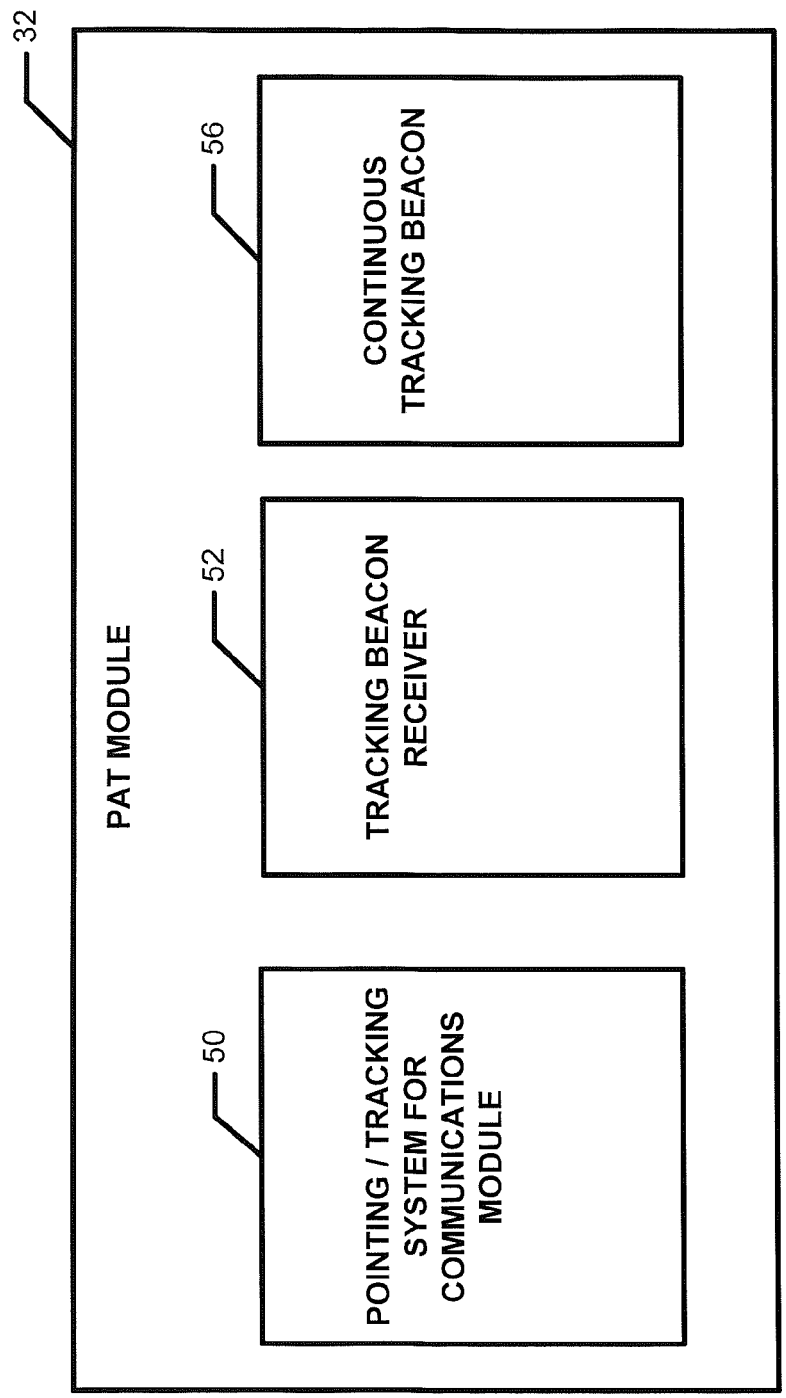
FIG. 5 is a block diagram of a pointing, acquisition and tracking (PAT) module which may be used in an STDMA access node of the type shown in FIGS. 1-3.

Referring now to FIG. 5, PAT module 32 includes a pointing/tracking system 50, a tracking beacon receiver 52 and a continuous tracking beacon 56.

Tracking beacon receiver 52 receives the beacon signals provided thereto from a remote terminal via a PAT aperture. Tracking beacon receiver 52 is used to determine the direction from which the tracking beacon is arriving and may be provided, for example, using such components as focal plan arrays, quad cells or optical nutators.

Continuous tracking beacon 56 provides a beacon signals to a remote terminal via a PAT aperture. The continuous tracking beacon 56 may be provided, for example, from a laser.

It should be appreciated that tracking beacon receiver and continuous tracking beacon can each be integrated into a single aperture (i.e., they may share an aperture) or alternatively they could each be provided having a separate aperture (i.e., a tracking aperture and a separate transmit aperture in a bi-static arrangement). Factors to consider in determining whether a shared aperture or separate apertures should be used include but are not limited to the cost, SWaP and amount of isolation required between the transmitted and received beacons for a particular application. Typical isolation techniques include but are not limited to using different polarizations and/or different wavelengths for the transmitted and received beacons.

In one embodiment, a low bandwidth modulation may be applied to the beacon for control information to be provided to the remote terminal. For this purpose an encoder/decoder performs the functions of encoding the tracking beacon sent and decoding the tracking beacon received from the remote terminal. Low bandwidth is preferred because it minimizes the impact on the tracking link budget and design of the tracking sensor, and little data need to be exchanged for control functions.

It should also be appreciated that if the tracking beacon (18 in FIG. 1) sent to the remote terminals is at the same wavelength as the optical communications transmit beam (16a in FIG. 1), beacon 18 directed to a specific remote terminal must be disabled while the access node is communicating with that remote terminal to prevent optical interference between the two beams. While this occurs the remote terminal will track the access node using the communications beam 16a. Similarly, if the remote terminal uses a tracking beacon (20 in FIG. 1) distinct from its transmit communications beam (21 in FIG. 1), then 20 must be disabled while communicating with the access node if it is at the same wavelength as 21. If the remote terminal uses the same beam for both the beacon and communications, the change required is to apply the communications modulation to the beam during the dwell time and disable the low-bandwidth control modulation if used.

Figure 6:
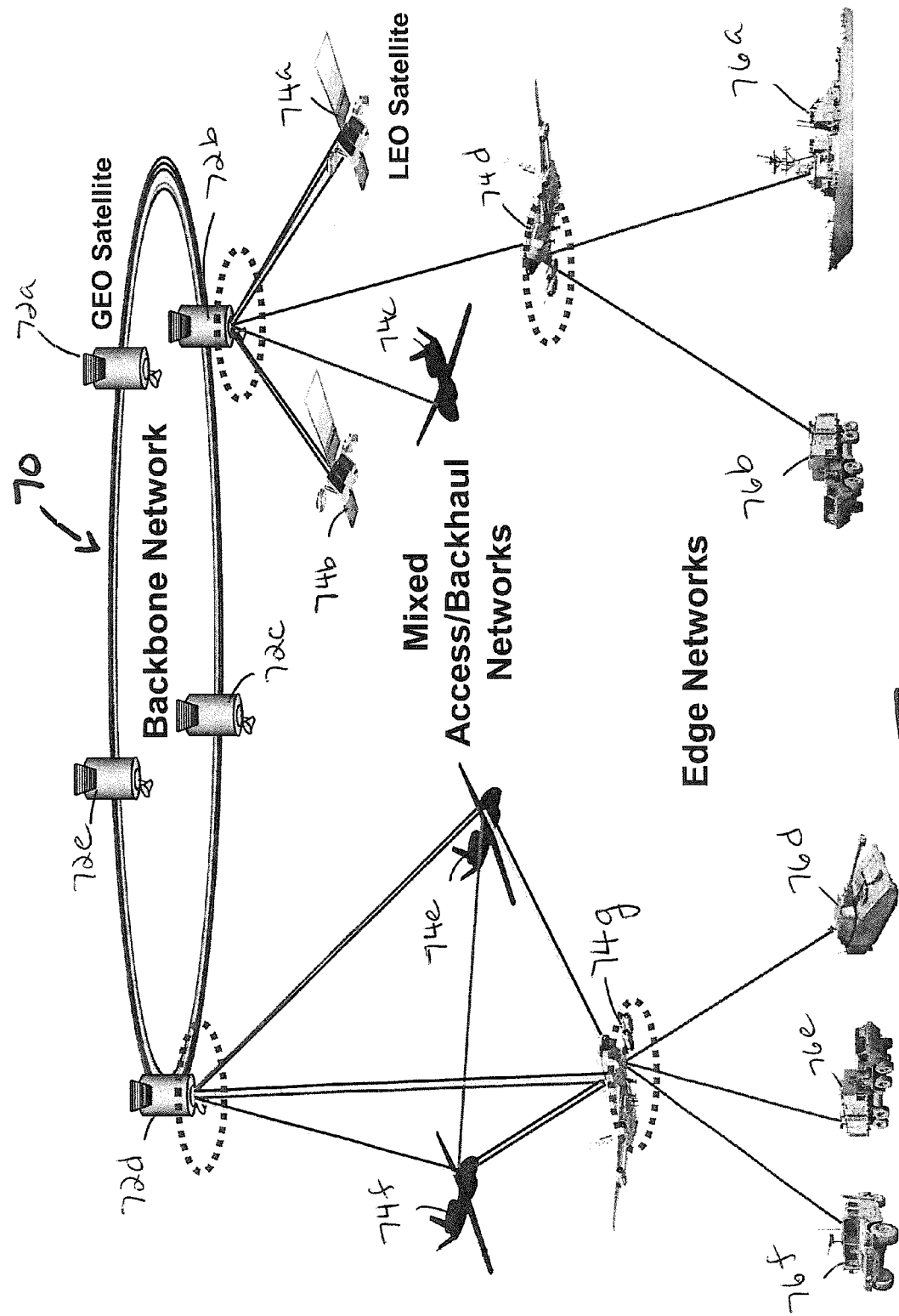
FIG. 6 is a block diagram of a system which utilizes multiple STDMA access nodes.

Referring now to FIG. 6, in one application, a backbone network 70 includes a plurality of nodes 72a-72e here shown as a plurality of satellites (here shown as satellites in geosynchronous orbit about the earth). Platforms supporting nodes for the backbone network can also include an access node which operates in accordance with the concepts and techniques described above in conjunction with FIGS. 1-6. In FIG. 7 platforms 72b, 72d include STDMA access nodes.

With respect to platform 72b, remote terminals to this access node include satellites 74a, 74b and aircraft 74c, 74d. With respect to platform 72d, remote terminals to this access node include aircraft 74e-74f.

Its should be appreciated that the platforms 74d and 74g supporting both remote terminals and also include STDMA access nodes. Thus, platform 74d includes both a remote terminal and an access node and thus provides STDMA communications to remote terminals 76a, 76b. Likewise, platform 74g includes a remote terminal and supports an access node and thus provides STDMA communications to remote terminals 76d-76f.

Accordingly, it should be evident from the system shown in FIG. 6 that STDMA access nodes may be deployed at any point within a network—e.g., on platforms also supporting backbone nodes, in mixed access/reachback networks or in edge networks. Moreover, FIG. 6 illustrates that networks can be hierarchal or tiered, and that the connection between an end-user and the backbone may pass through multiple tiers of access and traffic aggregation networks.

The STDMA system concept inherently supports multiple QoS policies that enable different users to receive different average bandwidths by giving each a different dwell time, as well as different latencies by visiting certain remote terminals multiple times within one cycle (different inter-dwell time intervals for remote terminals). The bandwidth and latency resources devoted to each remote terminal can be dynamically adjusted during a connection through the exchange of control information.

The data rates for transmit (Tx) and receive (Rx) operations can be different. In fact, the access node can operate in simplex mode (unidirectional Tx-only or Rx-only) with any given remote terminal. This is because the optical communications beams are not required for tracking purposes since there are dedicated tracking beacons and PAT apertures. In addition, control information is sent on the tracking beacons, so the optical communications beams are not required for modifying resource allocations. The simplest implementation would use the same link line rate and wavelength for all remote terminals. However, the access node can be designed to vary the channel data rate between terminals to adapt to supporting lower capability terminals. The channel data rates can be varied using either a rate adaptive Tx/Rx module (e.g., pulse position modulation) or by switching between multiple fixed-rate Tx and Rx modules using an optical cross-connect.

In some embodiments, the STDMA node also supports wavelength division multiplexing (WDM) as a means for increasing bandwidth without increasing the optical line rate. This is advantageous because it enables the access node to support a heterogeneous array of remote terminals with different capabilities. Remote terminals with high average data rate requirements can be accommodated using multiple wavelengths, each at a modest data rate (e.g., 2.5 Gb/s). Lower capability remote terminals can satisfy their communications requirement with a single optical channel at the same data rate. This simplifies the design of the nodes, standardizes modules, and uses low-cost modules for the low-capability remote terminals. The access node is capable of switching between single- and multiple-wavelength operation on a per-remote-terminal basis.

The STDMA node is capable of using different Tx and Rx wavelengths for remote terminals. However, this will seldom be necessary because the small optical beam diameters will not result in interference between the remote terminals unless they are extremely close to each other (e.g., aircraft in close formation or vehicles clustered together). Using a common set of wavelengths for all remote terminals lowers the cost, simplifies the design, and results in faster switching operation. There are no fundamental limitations on the wavelengths of operation, although it is preferable to use wavelengths with favorable atmospheric propagation characteristics, that are eye-safe (high threshold for ocular damage) and for which low-cost components are available.

Because the STDMA node operates in burst mode, an asynchronous physical layer protocol is required. Continuous transmission approaches such as used for SONET/SDH or the Optical Transport Network (G.709) are problematic because the interruption of communications caused by beam hopping produces an error condition and requires a resynchronization when the signal is restored. In recent years significant progress has been made in extending local area network (LAN) protocols to larger networks. These protocols, like $\frac{1}{10}$ Gbit Ethernet, are designed to support intermittent transmission of frames and are appropriate for a burst-mode transmission system.

To maximize bandwidth efficiency, the STDMA node requires a PAT subsystem for each active user. This includes an optical aperture with a beam steering module to simultaneously transmit and receive tracking beacons. The PAT optical aperture can be much smaller than the corn beam aperture because of the lower bandwidth utilized. The PAT subsystem provides tracking of the assigned remote terminal based on the tracking beacon received from that terminal. This beacon can be the same as the communications beam or it can be a dedicated tracking beacon. Since the latter can be of lower power than the communications beam and the beacon must be on continuously while communications is only performed intermittently, it is possible to save power at the remote terminal by using a dedicated tracking beacon rather than leaving the communications beam on continuously. Alternatively, the power of the beam can be reduced when it is in beacon mode compared to communications mode. In this way re-acquisition of the remote terminals is not required while hopping; the system knows exactly where to point the communications beam steering module when the time slot for a specific remote terminal comes up. A continuous tracking beacon is also sent to each remote terminal to enable it to retain track on the access node while the latter's Tx beam is pointed to other users. Because the tracking beacons can be modulated with low-bandwidth control information, tracking state feedback from the opposite terminals can also be continuously exchanged.

While the most common initiation of acquisition of a remote terminal will be through control information received over the operations and management network, the STDMA access node can also support ad hoc acquisition of unscheduled users. This can be done by using the spare PAT apertures to search all or part of the solid angle (field-of-regard) accessible to the access node for acquisition beacons from remote terminals requesting service. This, of course, requires additional security precautions, including beacon authentication.

The control functions at the STDMA node utilize information received both from the remote terminals over the modulated tracking beacon and from the non-associated operations and management network through the host platform. This includes instructions to establish connections or disconnect specified remote terminals. Disconnect instructions may also be received or sent over the tracking beacon link with the remote terminal. Because of the shared bandwidth nature of this STDMA concept, QoS and resource reservation are important functions. Initial QoS, including guaranteed average bandwidth and latency, will be negotiated through the operations and management network. An advantage of the STDMA node is that QoS can be updated dynamically on a per-user basis as access node resource availability and user requirements change. While this can also be done over the non-associated operations and management network, it is more efficient to negotiate these changes over the tracking beacon control channel that this concept supports.

Free-space optical (FSO) laser communications links are used for high-bandwidth data transmission were optical fiber is not practical. These links are costly in terms of dollars, size, weight, and power. For FSO network access nodes, as with access nodes, the average data rate for each user is typically much lower than the link line rate. Just as for wired and RF wireless access networks, an FSO node can aggregate traffic from multiple low-average-bandwidth users. This invention is an FSO node that uses precise electronic beam steering to provide access to a variable number of users by means of both space- and time-division multiple access. This lowers the cost and SWaP of the node and increases flexibility compared to dedicated FSO links.

Prior attempts to provide multiple access for FSO lasercom have used dedicated facilities. The earliest approaches duplicated the complete Tx/Rx and beam control apparatus for each user. In essence, they employ a single access system with full data rate for each remote terminal. For this approach there is no scaling benefit: the cost and SWaP grow linearly with the number of users. More advanced approaches share the beam forming system between remote terminals but require separate Tx/Rx and fine beam steering/tracking modules for each user. While this provides some scaling benefit, the most expensive modules must be duplicated for each remote terminal. In addition, all remote terminals must be within the field-of-view of a single telescope. This restricts the angular distribution of remote terminals to cone with about a 2° full angle.

This concepts, techniques and systems described herein solve the cost and SWaP problem by sharing the largest and most expensive modules of the access node among all the remote terminals through space-time division multiple-access (STDMA). A single lasercom Tx and Rx unit is used for all remote terminals. Space-division multiple-access is provided by using high-speed, agile, precise electronic beam steering to hop the transmit beam and receive direction from remote terminal to remote terminal. Time division multiple-access is provided by assigning each remote terminal a time slot coincident with the dwell time of the beam on that remote terminal. To enable fast hopping without spatial re-acquisition, the access node has one Pointing, Acquisition, Tracking (PAT) aperture for each remote terminal. This aperture continuously receives the tracking beacon from the remote terminal (which may also be the same as the remote terminal's Tx beam) so the access node's Tx/Rx optical train can be immediately pointed to the remote terminal when its time slot is active. In addition, the PAT aperture transmits a tracking beacon pointed at the remote terminal so that the remote terminal can continuously track the position of the access node. These beacons can also be modulated to transmit low-bandwidth control and order wire information between the access node and the remote terminals. Since the PAT apertures are much smaller and less expensive than the communications aperture, it is cost-effective to scale a STDMA node to a large number of remote terminals. The tracking beacons also are much lower power than the communications beam. One performance cost is that because the access node Tx/Rx facility is shared among all remote terminals, the average bandwidth per remote terminal goes down as the number of remote terminals increases. This is a common situation in access networks (e.g., cable internet access, fiber-to-the-home) and can be addressed through policy-based quality-of-service (QoS) management with resource scheduling. Wavelength division multiplexing (WDM) can also be used to increase the bandwidth per remote terminal with minimal increase in cost and SWaP. Another performance cost is the latency produced by the time the access node spends communicating with other remote terminals. This results in a trade-off between bandwidth efficiency and latency and buffer size. This trade-off can be adjusted dynamically on a per-remote-terminal basis as part of the QoS policy negotiation.

Because optical beams are extremely narrow compared to RF beams, optical time-division multiple-access (TDMA) can only be implemented for remote terminals situated at exactly the same location. Thus, the concepts used for RF TDMA cannot be applied to the general problem of FSO remote terminals randomly distributed in space. Instead a combination of time and space multiplexing techniques must be employed. Effective space multiplexing, however, requires fast, agile beam pointing that can quickly redirect an optical beam to different angles within the field-of-regard of the access node. Earlier approaches to FSO multiple-access have used replicated single-access systems or dedicated optical channels with a shared beam forming module. This STDMA concept goes beyond these and is the first to provide: sharing of the most expensive and largest SWaP modules amongst all remote terminals; aggregation of low-average-bandwidth data from multiple remote terminals; flexibility in the number of remote terminals served by a single access node; the ability to dynamically allocate resources and provide different bandwidth and QoS to each remote terminal and change these in real time.

The use of tracking beacons to carry order wire and control information, including tracking, power-on-target data, and bandwidth needs. These capabilities are enabled by the use of precise electronic beam steering such as made possible by optical phased arrays (OPAs).

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A space-time division multiple-access (STDMA) laser communications system comprising:
    a plurality of remote nodes; and
    an STDMA node having an optical communications aperture and a plurality of optical pointing, acquisition and tracking (PAT) apertures, with each of the plurality of PAT apertures having a beacon beam in communication with one of said plurality of remotes nodes.

2. The system of claim 1 wherein to move a communications beam among said plurality of remote nodes, the optical communications aperture uses at least one of:
    electronic beam steering; or
    mechanical beam steering.

3. The system of claim 1 wherein said STDMA node utilizes a space and time-division multiple access technique to communicate with each of said plurality of remote nodes.

4. The system of claim 1 wherein said STDMA node establishes a communication link between said STDMA node and each of said plurality of remote nodes.

5. The system of claim 4 wherein said communication links between said STDMA node and said plurality of remote nodes are one of:
    unidirectional; or
    bidirectional.

6. The system of claim 5 wherein said communication links between said STDMA node and said plurality of remote nodes are different for each remote node.

7. The system of claim 4 wherein the communications links between said STDMA node and said plurality of remote terminals can utilize wavelength division multiplexing.

8. The system of claim 7 wherein the number of wavelengths multiplexed can vary among said plurality of remote nodes.

9. The system of claim 1 wherein said optical communications aperature is configured to operate only in transmit mode.

10. The system of claim 1 wherein said optical communications aperature is configured to operate only in receive mode.

11. The system of claim 1 wherein said optical communications aperature is configured to operate simultaneously in transmit and receive modes.

12. The system of claim 1 wherein said STDMA node is one of:
    a stationary node or a mobile node.

13. The system of claim 1 wherein said plurality of remote nodes are one of:
    a stationary node or a mobile node.

14. The system of claim 1 wherein the number of remote nodes served by a single STDMA node may be fixed or varying.

15. The system of claim 1 wherein said optical communications aperture is a first one of a plurality of optical communications apertures in said STDMA node.

16. The system of claim 1 wherein the number of PAT apertures on the STDMA node may be the same or different than the number of remote nodes.

17. The system of claim 1 wherein the number of tracking beacons transmitted from said STDMA node may be the same or different than the number of remote nodes.

18. The system of claim 1 wherein a dwell time of an STDMA node downlink (D/L) transmit beam and an uplink (U/L) receive direction may be the same for all remote nodes or different for some or all remote nodes.

19. The system of claim 1 wherein a revisit interval in a hopping sequence (latency) is the same for all remote nodes or different for some or all remote nodes.

20. A method for operating an optical communications system, the method comprising:
    transmitting a plurality of beacon beams from an STDMA node to locate a corresponding plurality of remote nodes;
    selecting one of said plurality of remote nodes; and
    directing an STDMA node downlink (D/L) transmit beam to the selected remote node to establish a communications link between the STDMA node and the selected remote node.

21. The method of claim 20 wherein directing a downlink (D/L) transmit beam comprises electronic beam steering the downlink (D/L) transmit beam to the selected remote node.

22. The method of claim 21 wherein directing the downlink (D/L) transmit beam includes utilizing a space and time-division multiple access technique to communicate with each of said plurality of remote nodes.

23. The system of claim 22 wherein a dwell time of an STDMA node downlink (D/L) transmit beam is the same for all remote nodes.

24. The system of claim 22 wherein a dwell time of an STDMA node downlink (D/L) transmit beam is different for at least some of the plurality of remote nodes.

25. The method of claim 22 wherein a revisit interval in a hopping sequence is the same for all remote nodes.

26. The method of claim 22 wherein a revisit interval in a hopping sequence is different for at least some of the remote nodes.

* * * * *